US009604697B2

(12) United States Patent
Yeh et al.

(10) Patent No.: US 9,604,697 B2
(45) Date of Patent: Mar. 28, 2017

(54) MOBILITY VEHICLE AND POWER-ASSISTING SYSTEM

(71) Applicant: National Tsing Hua University, Hsinchu (TW)

(72) Inventors: Ting-Jen Yeh, Hsinchu (TW); Chun-Feng Huang, Hsinchu (TW); Bang-Hao Dai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/818,753

(22) Filed: Aug. 5, 2015

(65) Prior Publication Data

US 2016/0059928 A1   Mar. 3, 2016

(30) Foreign Application Priority Data

Aug. 29, 2014  (TW) .............................. 103129811 A

(51) Int. Cl.
| | |
|---|---|
| *B62M 6/50* | (2010.01) |
| *A61G 5/04* | (2013.01) |
| *B60L 11/16* | (2006.01) |
| *B60L 11/18* | (2006.01) |
| *B62M 6/45* | (2010.01) |
| *A61G 5/02* | (2006.01) |

(Continued)

(52) U.S. Cl.
CPC .............. *B62M 6/50* (2013.01); *A61G 5/022* (2013.01); *A61G 5/041* (2013.01); *A61G 5/10* (2013.01); *B60L 11/1805* (2013.01); *B62M 6/45* (2013.01); *A61G 7/018* (2013.01); *A61G 2203/38* (2013.01)

(58) Field of Classification Search
CPC ........ B62M 6/50; B62M 6/45; B60L 11/1805; A61G 5/041; A61G 5/022; A61G 5/10; A61G 7/018; A61G 2203/38
USPC .......................................................... 701/22
See application file for complete search history.

(56) References Cited

U.S. PATENT DOCUMENTS

| | | | |
|---|---|---|---|
| 6,354,390 B1 * | 3/2002 | Uchiyama | A61G 5/045 180/6.5 |
| 8,272,461 B2 * | 9/2012 | Bekoscke | A61G 5/043 180/65.1 |

(Continued)

*Primary Examiner* — Atul Trivedi
(74) *Attorney, Agent, or Firm* — Mintz Levin Cohn Ferris Glovsky and Popeo, P.C.; Peter F. Corless; Steven M. Jensen

(57) ABSTRACT

A mobility vehicle includes a personal mobility vehicle having at least one wheel body and a power-assisting system. The power-assisting system includes an actuation unit, a sensing unit and a signal processing unit. The actuation unit has a motor and a power amplifier geared with the motor. The sensing unit includes a motor rotation speed sensor, a multi-axis accelerometer and a multi-axis gyroscope, so as to sense the velocity, acceleration and the absolute angular velocity of the mobility vehicle in motion in real time. The signal processing unit is connected to the actuation unit and the sensing unit, so as to process the signals of the sensing unit. Then, the actuation unit performs inertia compensation, damping compensation and gravity compensation to the mobility vehicle through a dynamic signal-conditioning algorithm. When the mobility vehicle is actuated by human-power, the power-assisting system assists the power automatically to save human labor.

14 Claims, 11 Drawing Sheets

(51) Int. Cl.
*A61G 5/10* (2006.01)
*A61G 7/018* (2006.01)

(56) References Cited

U.S. PATENT DOCUMENTS

| | | | | |
|---|---|---|---|---|
| 8,910,975 | B2* | 12/2014 | Bekoscke | A61G 5/043 |
| | | | | 180/65.1 |
| 9,328,807 | B2* | 5/2016 | Carter | |
| 9,346,335 | B2* | 5/2016 | Bekoscke | A61G 5/043 |
| 2011/0231041 | A1* | 9/2011 | Kim | B62D 37/06 |
| | | | | 701/22 |
| 2011/0231050 | A1* | 9/2011 | Goulding | B62D 57/024 |
| | | | | 701/26 |
| 2011/0313568 | A1* | 12/2011 | Blackwell | B25J 5/007 |
| | | | | 700/245 |
| 2013/0179016 | A1* | 7/2013 | Gale | B60L 11/007 |
| | | | | 701/22 |
| 2013/0207364 | A1* | 8/2013 | Bekoscke | A61G 5/045 |
| | | | | 280/124.104 |
| 2013/0253769 | A1* | 9/2013 | Kamo | B62D 11/003 |
| | | | | 701/42 |
| 2014/0062351 | A1* | 3/2014 | Spelta | B60L 11/1801 |
| | | | | 318/139 |
| 2014/0222267 | A1* | 8/2014 | Stevens | B62K 3/007 |
| | | | | 701/22 |
| 2014/0297070 | A1* | 10/2014 | Gros | B62M 6/50 |
| | | | | 701/22 |
| 2015/0196441 | A1* | 7/2015 | Mulhern | A61G 5/04 |
| | | | | 180/170 |
| 2016/0258758 | A1* | 9/2016 | Houston | G01C 21/20 |

* cited by examiner

MOBILITY VEHICLE AND POWER-ASSISTING SYSTEM

CROSS-REFERENCES TO RELATED APPLICATIONS

This application claims under 35 U.S.C. §119(a) the benefit of Taiwanese Application No. 103129811, filed Aug. 29, 2014, the entire contents of which are incorporated herein by reference.

BACKGROUND OF THE INVENTION

1. Field of the Invention

The present invention relates to power systems, and more specifically, to a power-assisting system of a mobility vehicle.

2. Description of the Related Art

Common personal mobility vehicles, such as bicycles, wheelchairs, baby buggies, trolleys and so on, are moved by human-power with hands or legs. It takes considerable energy and physical strength when the mobility vehicle is loaded heavily or moves uphill, which causes muscle fatigue. While, when the mobility vehicle moves downhill, the mechanical kinetic energy is converted to unrecyclable heat energy due to the use of a mechanical brake. Therefore, the mobility vehicle is often inefficient and energy-wasting in such applications.

Accordingly, power-assisted devices such as power-assisted bicycles or power-assisted wheelchairs are developed. In such devices, the driving wheel is replaced with an electric motor, and the pedaling or hand-propelling is detected by a sensor. The sensed signal is amplified as a command to a power amplifier, and finally a motor force is generated to assist the movement, especially when moving uphill. Moreover, the power-assisted mobility vehicle can adjust the magnification of the motor force to a desirable value through a connection with a micro-computer. A switch or an electric throttle can be incorporated to switch the mode of operation among the manual mode, the power-assist mode and the full electric mode, so as to save the electrical power or human labor.

However, as far as the conventional power-assisted bicycles and power-assisted wheelchairs are concerned, a force/torque sensor is often required to sense the human power; such sensors are expensive and may not convert the force instantaneously due to the limited bandwidth. Moreover, the calibration of the sensors is laborious which would cost engineering resources. Finally in order to mechanically accommodate the force/torque sensor, the mechanism of mobility vehicle has to be modified significantly.

Some of the conventional mobility vehicles, including the power-assisted bicycles or the power-assisted wheelchairs, may instead utilize a single-axial accelerometer as a level gauge to detect the inclination angle when the device is on a slope. In such a case, the accelerometer outputs a signal to the electric motor to generate an assisting force to cancel out gravitational force. By doing so, the required human power to move the mobility vehicle on the ramp is reduced.

However, when the accelerometer detects the inclination angle based on the projection of the gravitational force along the ramp direction, the inclination angle will be inaccurate if the mobility vehicle is operated in an accelerating or decelerating state, or is operated on a bumpy road, because the acceleration of the mobile device is also picked up by the accelerometer. In practice, it is typically assumed that the frequency of the acceleration is much higher than the frequency of inclination angle change, so the inclination angle can be obtained separately by filtering the accelerometer signal via a low-pass filter. However, filtering causes a time lag on the inclination angle detection which in turn causes a delay in the acquisition of the inclination angle. As a result, there will be a lag in the power assisting performance when the mobility vehicle first entering a ramp.

Moreover, although it has been proposed that by combining the acceleration output of a single-axial accelerometer and the absolute angular velocity of a gyroscope via signal fusion, one can reduce the delay in the inclination angle sensing, such a method still cannot completely eliminate the influence of acceleration/deceleration of the mobility vehicle on the inclination angle measurement. Also, when the mobility vehicle moves under large slope variations or performs multi-degree-of-freedom movement (e.g., when a bicycle or a wheelchair moves with a lateral tilt or a turning), such a signal fusion method could generate an erroneous output due to the nonlinearity in the system dynamics as well as the dynamic coupling effect.

Therefore, there is a need in the industry to overcome the problems of the conventional power-assisting techniques in mobility vehicles.

SUMMARY OF THE INVENTION

Given above disadvantages of conventional techniques, the present invention provides a novel power-assisting system, which performs inertia compensation, damping compensation and gravity compensation to save the human labor. In addition, it only requires sensors including a hall-sensing-based encoder which measures the motor speed, a multi-axis accelerometer and a multi-axis gyroscope. Such sensors are extensively used in electronics products, thus are broadly available and inexpensive compared to the force/torque sensors. Moreover, the sensors can be easily attached to and disposed on the mobility vehicle directly without any modification on the mechanical structure. Therefore, when the power-assisting system is applied to a mobility vehicle such as a wheelchair, a bicycle, a baby buggy, a trolley, and so on, the mobility vehicle can achieve superior power-assisting performance without the use of force/torque sensors.

The present invention provides a power-assisting system, comprising: at least one actuation unit comprising a motor and a power amplifier; a sensing unit comprising a motor rotating speed sensor, a multi-axis accelerometer and a multi-axis gyroscope which detect the motor rotating speed, the acceleration/deceleration and the absolute angular velocity of the mobility vehicle, respectively; and a signal processing unit connected to the actuation unit and the sensing unit to process signals provided by the sensing unit and calculate precise and instantaneous velocity, acceleration/deceleration, and inclination angle of the mobility vehicle, such that the actuation unit can generate a damping compensation, an inertia compensation and a gravity compensation to the mobility vehicle.

Moreover, the present invention further provides a mobility vehicle, comprising: at least one actuation unit comprising a motor and a power amplifier; a sensing unit comprising a motor rotating speed sensor, a multi-axis accelerometer and a multi-axis gyroscope which detect the motor rotating speed, the acceleration/deceleration and the absolute angular velocity of the mobility vehicle, respectively; and a signal processing unit connected to the actuation unit and the sensing unit to process signals provided by the sensing unit and calculate precise and instantaneous velocity, acceleration/deceleration, and inclination angle of the mobility vehicle, such that the actuation unit can generate a damping compensation, an inertia compensation and a gravity compensation to the mobility vehicle.

In said mobility vehicle, its movement is initiated by manual propulsion or pedaling, and the assisting power is provided by an electric motor. The motor is disposed on the wheel body, such that the motor and the wheel body constitute a wheel hub motor.

In said power-assisting system and mobility vehicle, the signal processing unit is connected to the power amplifier of the motor, and the signal processing unit is digital. Said power-assisting system and mobility vehicle further comprise at least one power supply unit electrically connected to the actuation unit, the signal processing unit and the sensing unit, and the power supply unit supplies electric power to the actuation unit, signal processing unit and the sensing unit.

Accordingly, in the power-assisting system or the mobility vehicle of the present invention, the movement of the system or the vehicle is achieved by rotating the wheel hub motor via manual propulsion or pedaling, and by processing the signals of the sensing unit, so that an assistive motor torque is generated to perform inertia, damping and gravity compensations. As such, the objective of power assisting is achieved.

For example, the mobility vehicle of the present invention can be applied to the conventional human-power propelled wheelchair or the conventional bicycle by incorporating the wheel hub motor to the vehicle, such that the human-power propelled wheelchair or the conventional bicycle becomes a power-assisted wheelchair or a power-assisted bicycle. When a user pushes the wheelchair or pedals the bicycle, the signals of the multi-axis accelerometer, (multi-axis) gyroscope and rotating speed sensor (which is usually a magnetic hall sensor) of the wheel hub motor are processed, so as to accurately calculate the vehicle velocity, the acceleration/deceleration, and the inclination angle. Moreover, the wheel hub motor is further controlled to perform inertia compensation and damping compensation when the vehicle is on level ground and to perform gravity compensation when the vehicle is on the ramp. Compared to the conventional human-power propelled wheelchair or the conventional bicycle, because the electric motor performs inertia compensation, the user feels less inertia, and thereby may accelerate or decelerate the wheelchair or the bicycle with less labor; because of the damping compensation, the resisting/frictional force from the ground is partially counteracted by the motor and the user can use less effort to operate the wheelchair or the bicycle; furthermore, because of the gravity compensation, the component of gravity acted on the wheelchair or the bicycle on the ramp, thus the inclination angle of the vehicle, can be calculated precisely. Using the sensed inclination angle, a proper motor torque can be generated to balance the gravitational force acted on the vehicle, so it is almost effortless for the user to move uphill with the mobility vehicle; also, when the user moves downhill with the mobility vehicle, there will not be too much acceleration because the gravity compensation automatically generates a braking motor torque to resist the gravity.

Moreover, when the wheelchair or the bicycle moves downhill, the current resulted from the braking motor torque can be recycled. In other words, the kinetic energy of the wheelchair or bicycle can be converted to recyclable electric energy, so as to provide the electric power required for power assisting and further extend the driving range of the power-assisted wheelchair or power-assisted bicycle.

In addition, the present invention can be applied to assist any wheeled mobility vehicle actuated by human-power, and thus is not limited to wheelchairs and bicycles.

DETAILED DESCRIPTION OF THE INVENTION

The following specific embodiments are provided to illustrate the disclosure of the present invention, the advantages and effects can be apparently understood by those skilled in the art after reading the disclosure of this specification.

It should be understood that, in the specification to the accompanying drawings, the depicted structures, proportions, sizes, etc., are disclosed only to match the content of the specification, and to facilitate the understanding for those skilled in the art, but not to limit the present invention in specific conditions. The depicted structures, proportions, sizes, etc. do not contain specific technical meanings. Any modification of the structure, change of the ratio relation, or adjustment of the size should be involved in the scope of disclosures in this specification without influencing the producible efficacy and the achievable objective of this specification. Also, in this specification, the referred terms such as "upper", "left", "right" and "a", etc., are only for descriptive purposes, not for limiting the scope of embodiment in this invention. Those changes or adjustments of relative relationship without substantial change of technical content should also be considered within the category of implementation.

Figure 1:
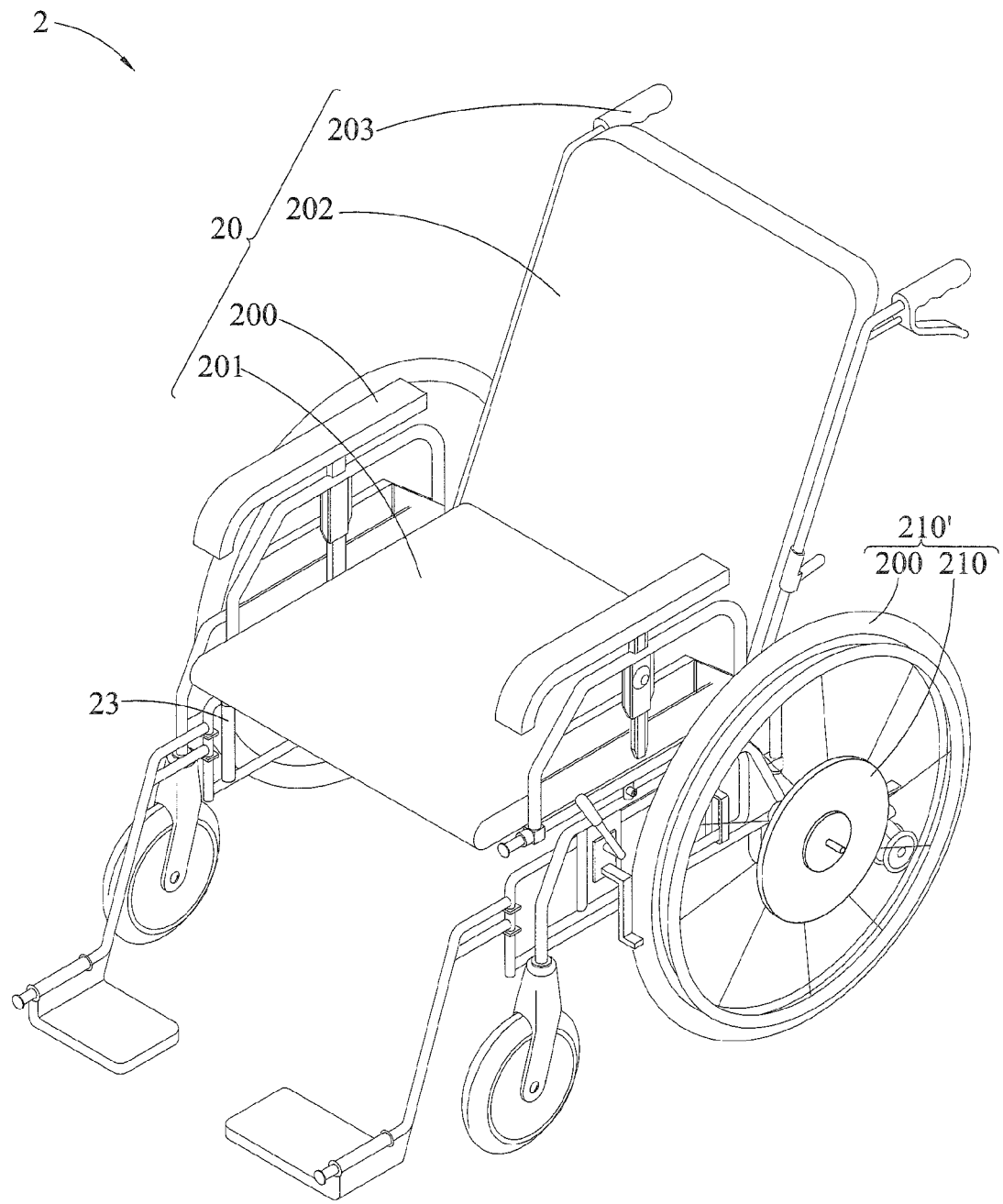
FIG. 1 is a front view of a mobility vehicle according to the present invention.
Figure 2:
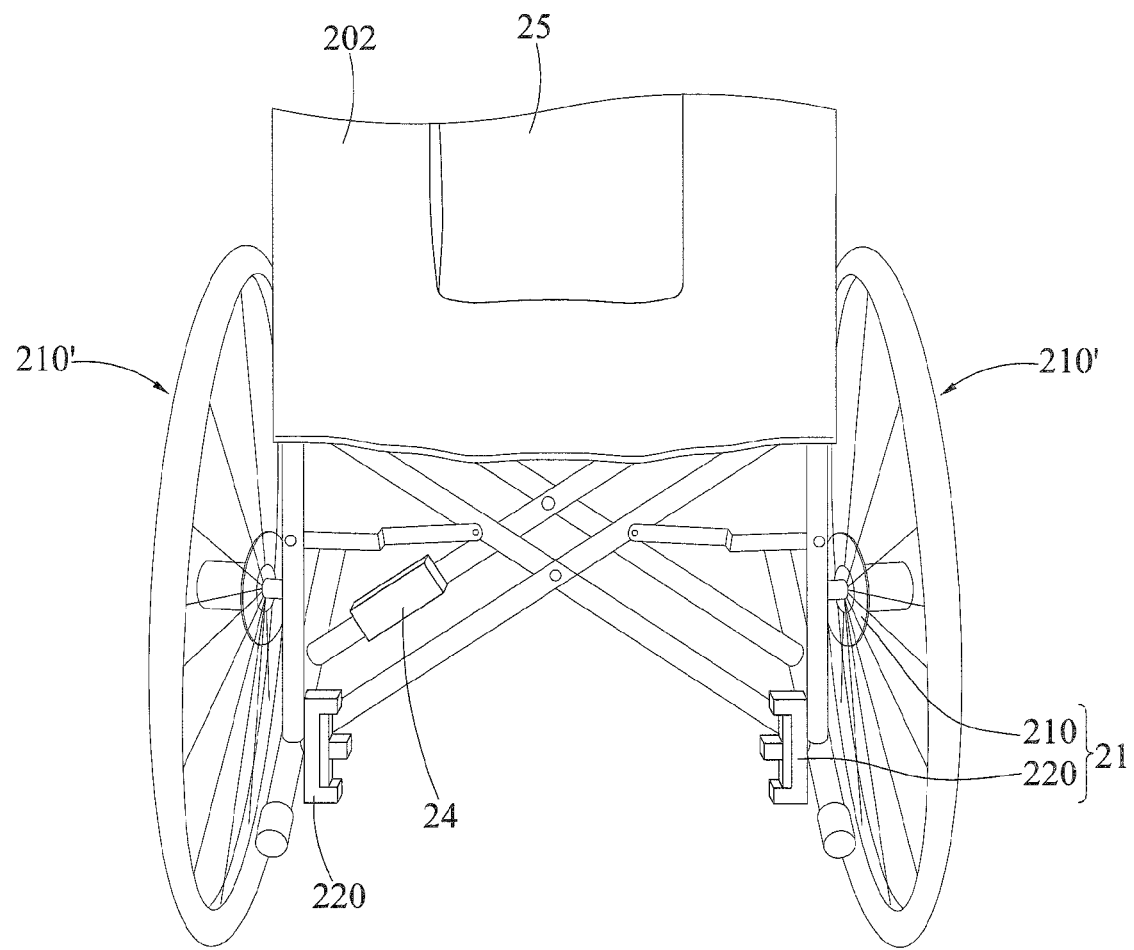
FIG. 2 is the rear view of the mobility vehicle according to the present invention.

FIG. 1 and FIG. 2 show the front view and the rear view of one example of mobility vehicles according to the present invention. As shown in FIGS. 1 and 2, the mobility vehicle 2 is a power-assisted wheelchair, comprising a personal mobility vehicle 20, such as a vehicle platform, and a power-assisting system.

The personal mobility vehicle 20 comprises a chair seat 201, two wheel bodies 200 disposed on left and right sides of the chair seat 201, and a seatback 202 mounted upright behind the wheel chair seat 201, so as to constitute a conventional wheelchair structure. In an embodiment, the personal mobility vehicle 20 is a human-power propelled wheelchair, and handles 203 are disposed on left and right sides of the seatback 202, respectively, for a user to push the personal mobility vehicle 20. In an embodiment, a handicapped person can also rotate the wheel bodies 200 by himself to move the personal mobility vehicle 20.

The power-assisting system comprises two sets of motors 210, two sets of power amplifiers 220, such as drivers, a set of sensing unit 23, a set of signal processing unit 24, and a set of power supply unit 25.

The motor 210 is disposed on an axis of the wheel body 200, such that the single motor 210 and the single wheel body 200 constitute a single wheel hub motor 210'.

In an embodiment, the motor 210 has a Hall sensor to sense the rotation speed of the motor.

The power amplifier 220 is electrically connected to the motor 210 to drive the motor 210, and the motor 210 and the power amplifier 220 constitute an actuation unit 21.

In an embodiment, the motor 210 is a brushless DC motor having a current sensor, which is disposed below the chair seat 201, and the power amplifier 220 is utilized to provide a control for the torque of the motor 210, and provide a measurement of a rotor speed and current of the motor 210.

The sensing unit 23 comprises a multi-axis accelerometer and a gyroscope which can be single-axial or multi-axial, and the sensing unit serves as an inertia sensor which can detect signals of the acceleration (including gravitational acceleration) and the absolute angular velocity of the personal mobility vehicle 20 in motion. The signals are computed by the signal processing unit 24, and the real time information of the acceleration and deceleration, and inclination angle of the personal mobility vehicle 20 is returned and provided to control the motor 210.

In an embodiment, the sensing unit 23 is disposed below the chair seat 201. When the mobility vehicle 2 is in motion, measured information of the sensing unit 23 and the signal of the Hall sensor of the motor 210 are computed by the signal processing unit 24 and are feedbacked to the motor 210, so as to generate an additional assistive torque to assist the human power. As such, whenever the mobility vehicle moves on the ground or on the ramp, less human labor is required to move the vehicle because of the assistive motor torque.

The signal processing unit 24 is electrically connected to the power amplifier 220 and the sensing unit 23 to process the signals of the sensing unit 23 and the Hall sensor of the motor 210, so as to control the motion of the wheel hub motor 210'.

In an embodiment, the signal processing unit 24 comprises a set of digital signal processor to control a main processing unit and to perform signal processing, acquisition, and so on. Moreover, the signal processing unit 24 is disposed below the chair seat 201.

The power supply unit 25 is electrically connected to the power amplifier 220, the signal processing unit 24 and the sensing unit 23, so as to act as a power supply of the power amplifier (driver) 220, the signal processing unit 24 and the sensing unit 23.

In an embodiment, the power supply unit 25 comprises a rechargeable battery, and the power supply unit 25 is disposed behind the seatback 202, for example, is disposed in a bag behind the seatback 202.

Moreover, wires used in the power-assisting system according to the present invention can be disposed and wired depending on the practical needs, and thus are not depicted in the drawings.

Figure 3:
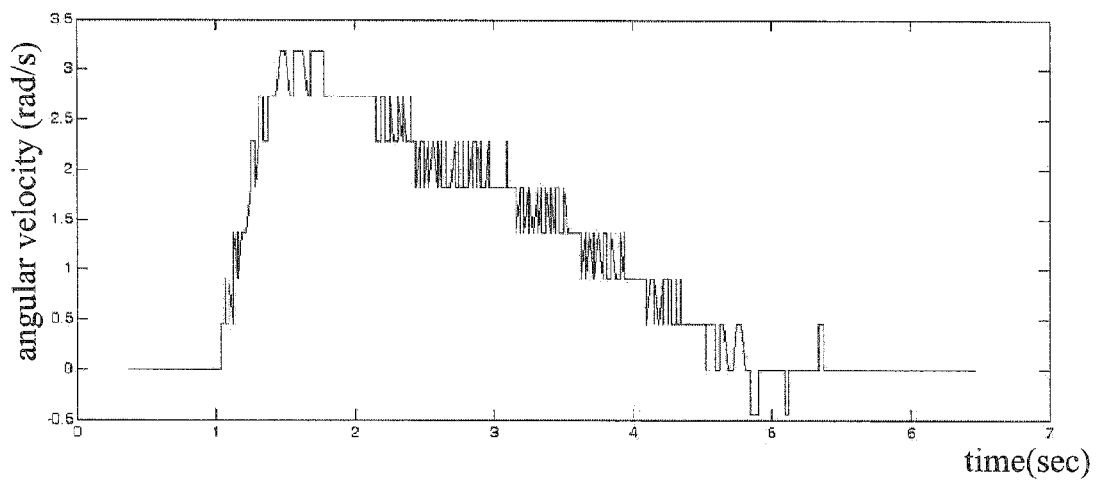
FIG. 3 (PRIOR ART) shows the experimental response of the wheel speed of a conventional wheelchair without damping compensation.
Figure 4:
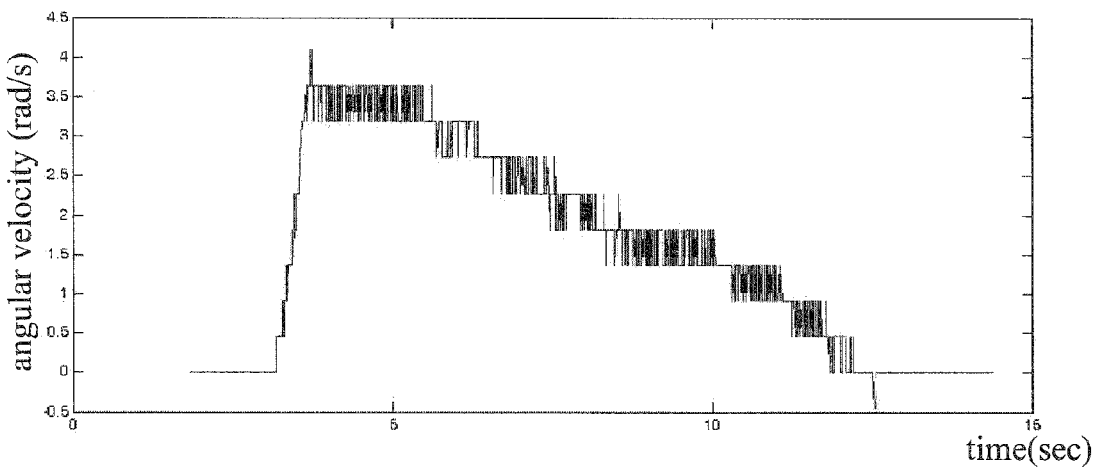
FIG. 4 shows the experimental response of the wheel speed of the proposed power-assisted wheelchair with damping compensation.

The power-assisting system and the mobility vehicle 2 according to the present invention use the multi-axis accelerometer and the multi-axis gyroscope of the sensing unit 23 and use the rotating speed signal of the Hall sensor of the motor 210 powered by the power amplifier 220, so as to calculate a precise and high-bandwidth acceleration and inclination angle of the mobility vehicle by the signal processing unit 24. In conjunction with the rotating speed signal of the Hall sensor of the motor 210, the signal processing unit 24 provides inertia, damping, and gravity compensations. Specifically, the following is the dynamic equation of the mobility vehicle 2 according to the present invention in motion, which is analyzed through the dynamics:

$$ma = F_m + F_{ext} - F_r - Bv - F_g$$

m: mass of the mobility vehicle (including an occupant)
a: acceleration of the mobility vehicle
$F_m$: propelling force provided by the motor
$F_{ext}$: force applied by a user
$F_r$: force caused by friction
B: damping constant
v: angular velocity of the wheel body
$F_g = mg \sin \theta$: component force of gravity in the movement direction of the mobility vehicle
g: acceleration of gravity
θ: inclination angle of the mobility vehicle With regard to the damping compensation, the assistive torque can be provided to counteract the resisting force by a sensing feedback of the rotating speed signal of the Hall sensor of the motor 210, so as to save the labor of the user. Given the dynamic equation, the resisting force caused by Bv can be canceled out by returning the velocity of wheelchair v (obtained by measuring the motor rotating speed) to make $F_m = Kv$, and thereby the free movement of the vehicle can last longer, wherein K is a gain constant and is slightly smaller than B. Regarding the comparisons between FIG. 3 and FIG. 4, FIG. 3 shows the experimental response of the wheel angular velocity without a damping compensation over time according to the conventional art, and FIG. 4 shows the experimental response of the angular velocity with a damping compensation over time according to the present invention. Accordingly, it can be obviously seen that with the same human force $F_{ext}$ being applied, the duration that the mobility vehicle according to the present invention moves forward is about twice as long as the mobility vehicle according to the conventional art.

Figure 5A:
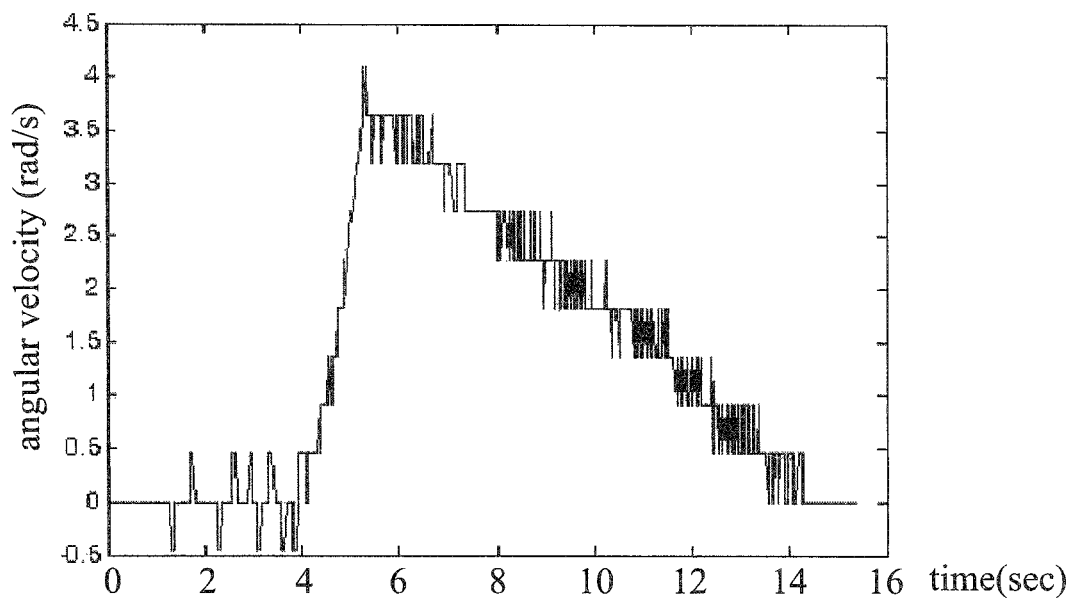
FIG. 5A (PRIOR ART) shows the experimental response of the wheel speed of a conventional wheelchair without inertia compensation.
Figure 5B:
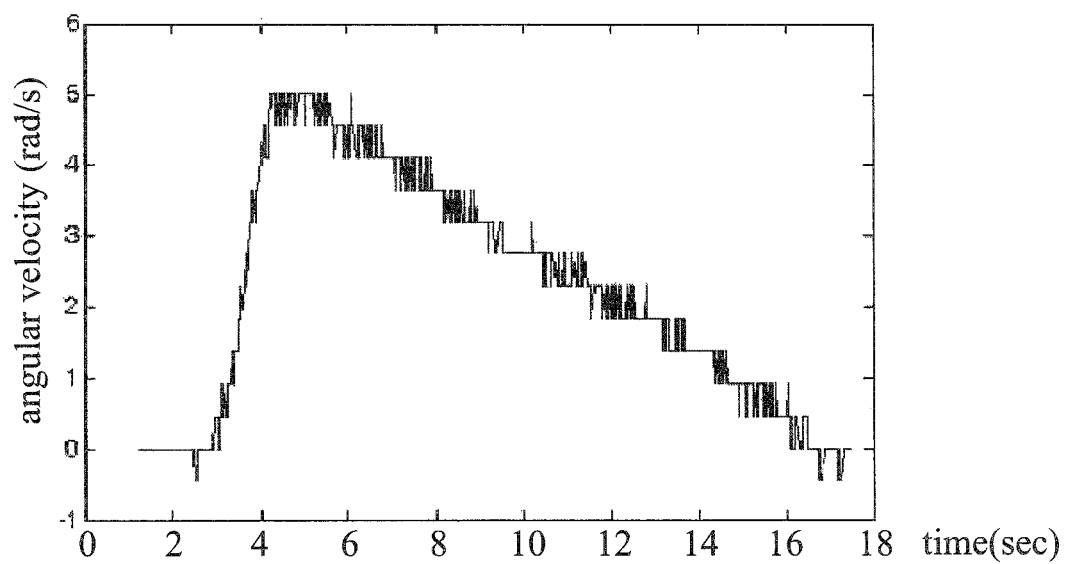
FIG. 5B shows the experimental response of the wheel speed of the proposed power-assisted wheelchair with inertia compensation.

With regard to the inertia compensation, the signal processing unit 24 calculates precise and high-bandwidth acceleration information of the mobility vehicle, and the information is feedbacked to the motor 210 to provide the assistive torque. This is equivalent to reducing the inertia of the mobility vehicle itself to apply less force to reach the same speed. According to the dynamic equation, by returning the acceleration information of the mobility vehicle a and letting Fm=½ ma, the dynamic equation can be rewritten as (½m) a=$F_{ext}$-$F_f$-Bv-$F_g$, that is equivalent to reducing the inertia by 50%, such that the acceleration can be doubled when the same force is applied. As shown in the comparison between FIGS. 5A and 5B, FIG. 5A shows the experimental response of the angular velocity of a wheel body without an inertia compensation over time according to the conventional art, and FIG. 5B shows the experimental response of the angular velocity of a wheel body with an inertia compensation over time according to the present invention. Accordingly, it can be obviously seen that with the same $F_{ext}$, the angular velocity of the mobility vehicle 2 according to the present invention is increased faster and the duration of the movement can last longer.

Figure 6:
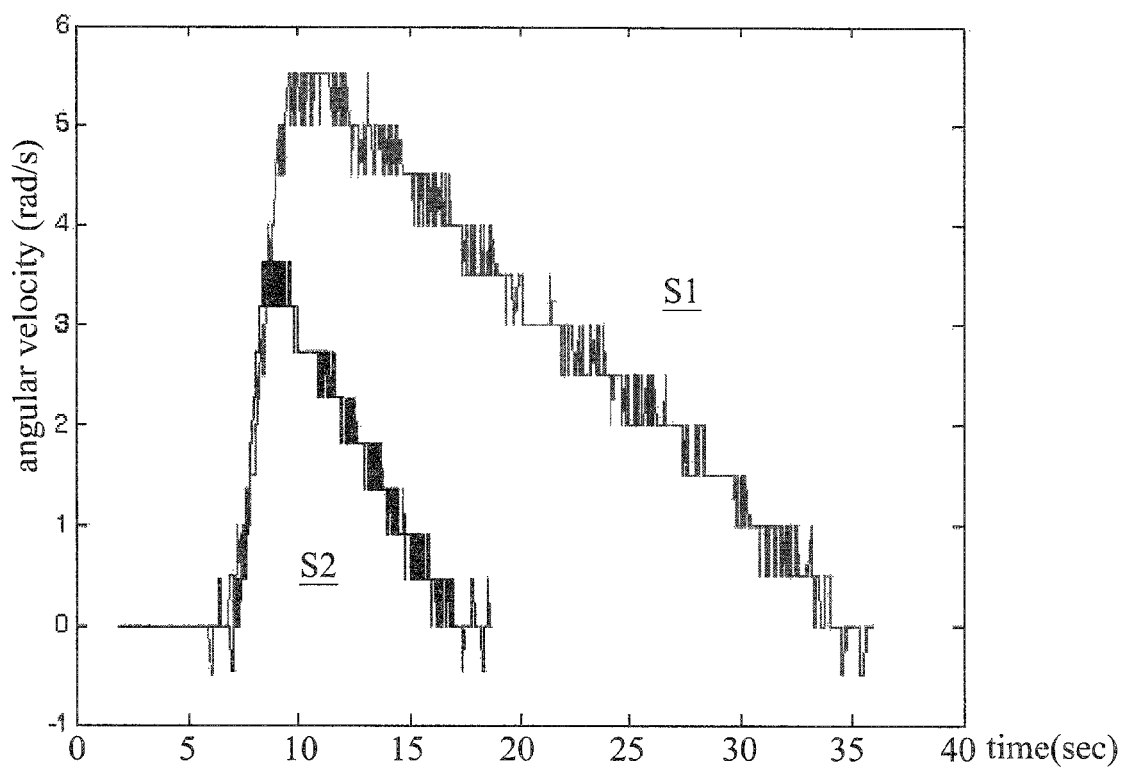
FIG. 6 shows the comparison of experimental responses between the wheel speed with damping compensation and inertia compensation according to the present invention with the wheel speed without damping compensation and inertia compensation according to the conventional art.

Moreover, FIG. 6 shows the comparison between the experimental response S1 of the angular velocity over time according to the present invention with the damping compensation and inertia compensation simultaneously and the experimental response S2 of the angular velocity over time according to the conventional art without damping and inertia compensations. Apparently, with the same $F_{ext}$, the angular velocity of the mobility vehicle 2 according to the present invention is increased faster and the duration of the movement can last longer.

Furthermore, with regard to the gravity compensation, after the signal processing unit calculates the precise and high-bandwidth inclination angle information of the mobility vehicle, the information is feedbacked to the motor 210 to provide the assistance, such that when the mobility vehicle 2 moves uphill, an assisting force is provided for the user to push or paddle the mobility vehicle 2 easier. In addition, when the mobility vehicle 2 moves downhill, a resisting force is provided by the motor for the user's safety. Given the dynamic equation, by returning the angle of the ramp through the accelerometer and the gyroscope, $F_m$=$F_g$=mg sin θ is achieved, so as to cancel out the resisting force caused by gravity on the ramp, such that the user can move easier on the ramp.

Figure 7A:
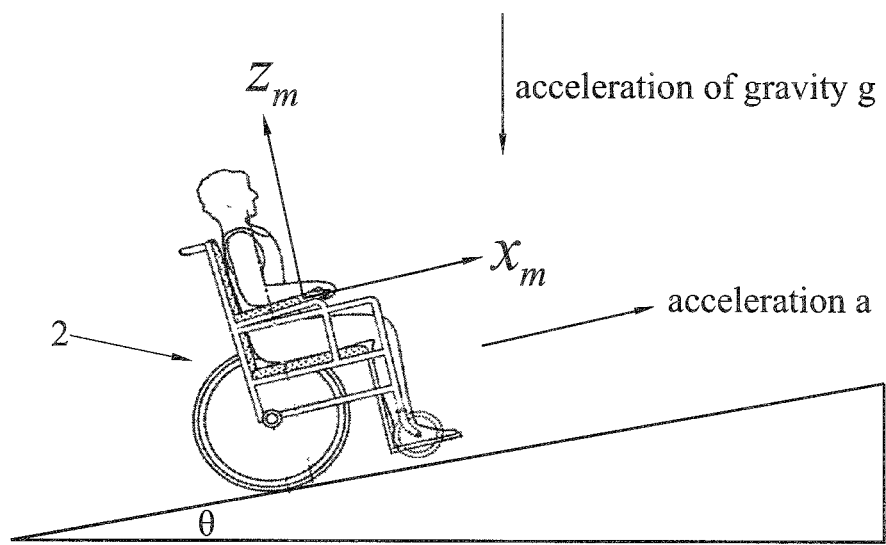
FIGS. 7A and 7B are schematic diagrams of the calculation carried out by the signal processing unit of FIG. 1 using the signals of a biaxial accelerometer and a single-axial gyroscope.
Figure 7B:
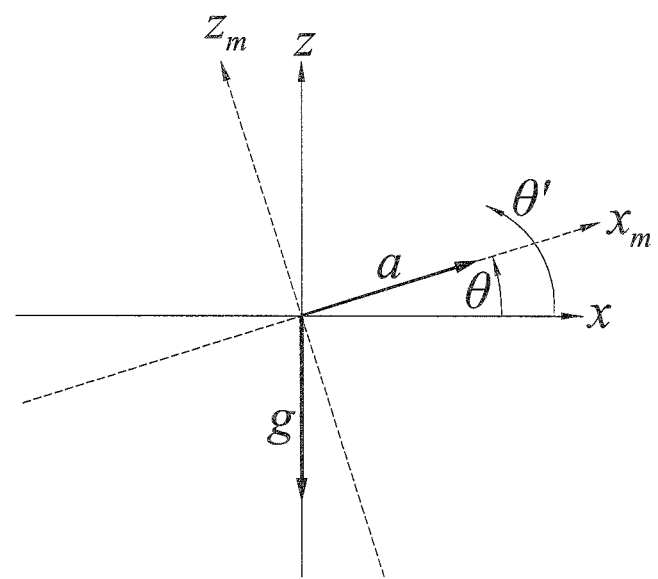

The following table shows the comparison between the power-assisted mobility vehicles according to the present invention and the conventional art:

FIGS. 7A and 7B illustrate how the signal processing unit 24 calculates the precise and high-bandwidth acceleration and the inclination angle of the mobility vehicle by using a biaxial accelerometer and a single-axial gyroscope. FIG. 7A shows that when the wheelchair moves forward on a ramp with acceleration a and an inclination angle θ, the biaxial accelerometer measures the accelerations in the moving direction $X_m$ and the vertical direction $Z_m$ of the wheelchair (i.e., the mobility vehicle 2). As shown in FIG. 7B, the signals of the accelerometer in the direction $X_m$ and direction $Z_m$ are:

$$a_{Xm}=g \sin θ+a;$$

$$a_{zm}=g \cos θ;$$

Figure 8:
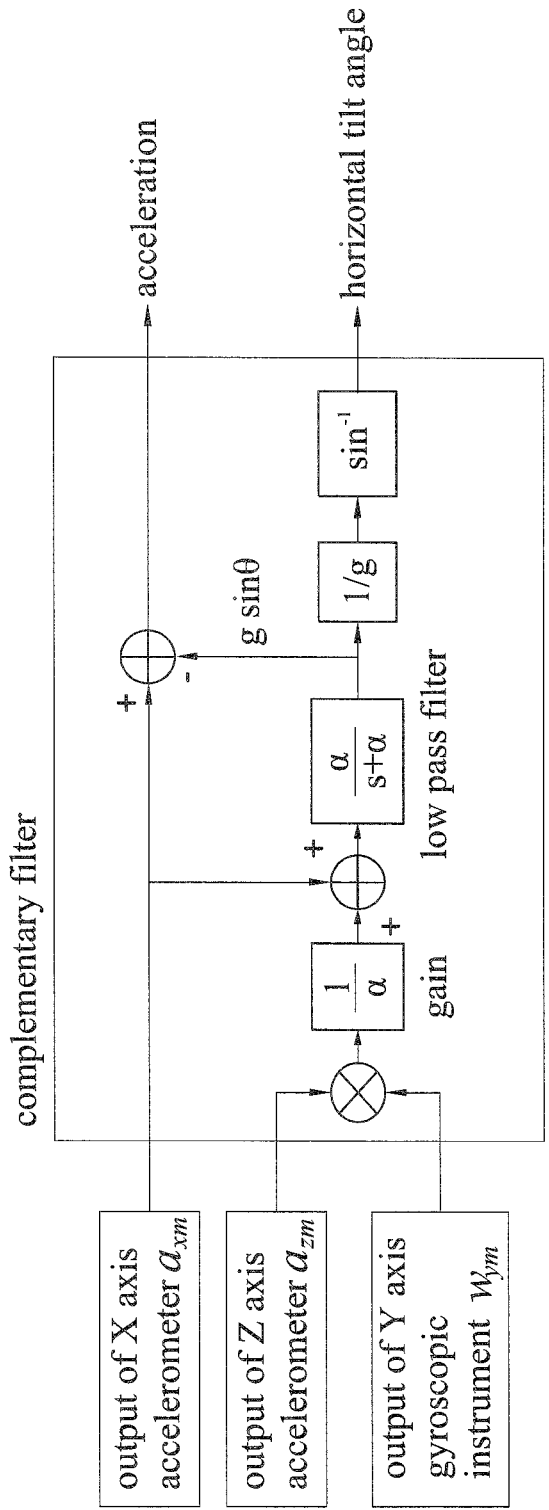
FIG. 8 shows a signal processing method of the signal processing unit according to the present invention.
Figure 9:
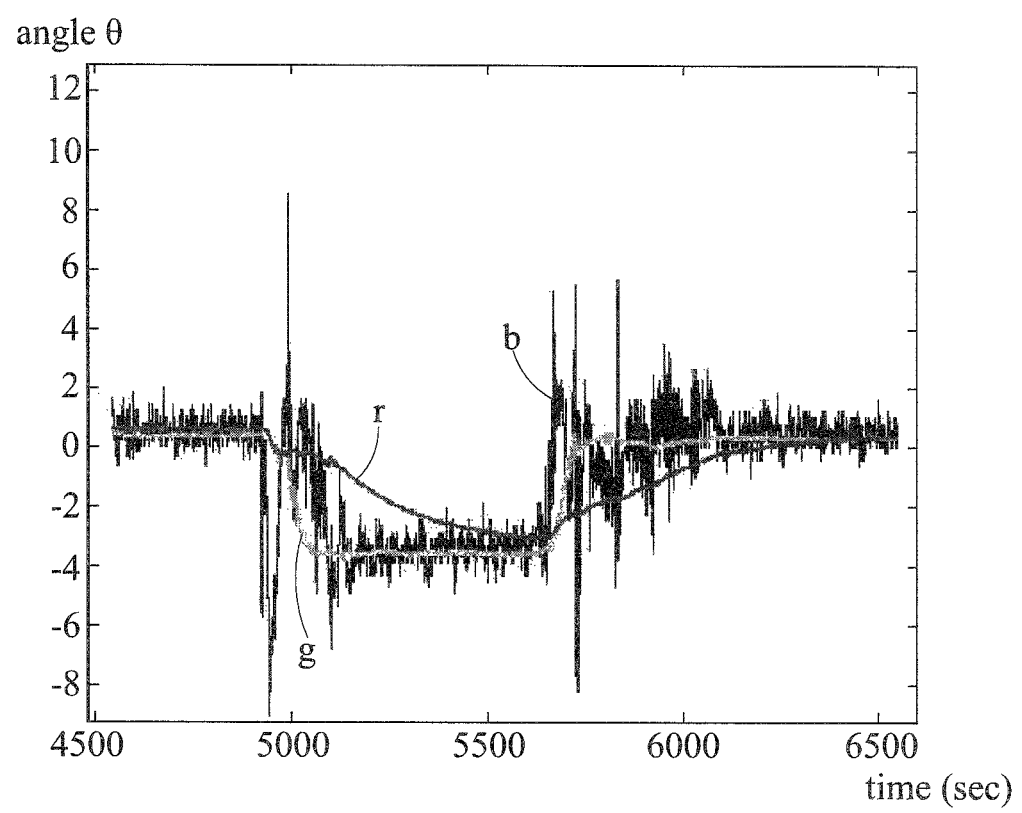
FIG. 9 shows the comparison of experimental inclination angle responses among the raw data (signal b), the data obtained by the signal processing method according to the present invention (signal g), and the data obtained by the signal processing method according to the conventional art (signal r)

Meanwhile, further by incorporating the absolute angular velocity $ω_{Ym}$=dθ/dt measured by the single-axial gyroscope, the precise and high-bandwidth signals of the acceleration and the inclination angle of the mobility vehicle can be obtained from the accelerations $a_{Xm}$, $a_{zm}$ and absolute angular velocity $ω_{Ym}$ through the signal processing method shown in FIG. 8. Basically, the signal processing method shown in FIG. 8 is achieved by a nonlinear multi-axial complimentary filter. According to the method, $a_{Zm}$ is multiplied by $ω_{Ym}$, and the signal is further multiplied by a gain (i.e., 1/α), and then a complimentary low pass filter is performed on $a_{Xm}$ (i.e., the signal α/(s+α)), and then the acceleration and the inclination angle of the mobility vehicle are obtained separately by nonlinear geometry computation, thereby reducing the time delay and the error caused by geometric nonlinearity. The experiment data in FIG. 9 presents the comparisons of the inclination angle (signal g) measure by this method, the angle (signal b) directly measured by a single accelerometer, and the angle (signal r) measured by a single accelerometer and further processed by low pass filtering to reduce noise. Accordingly, the inclination angle of the method according to the present invention has higher signal-to-noise ratio and higher bandwidth.

Figure 10A:
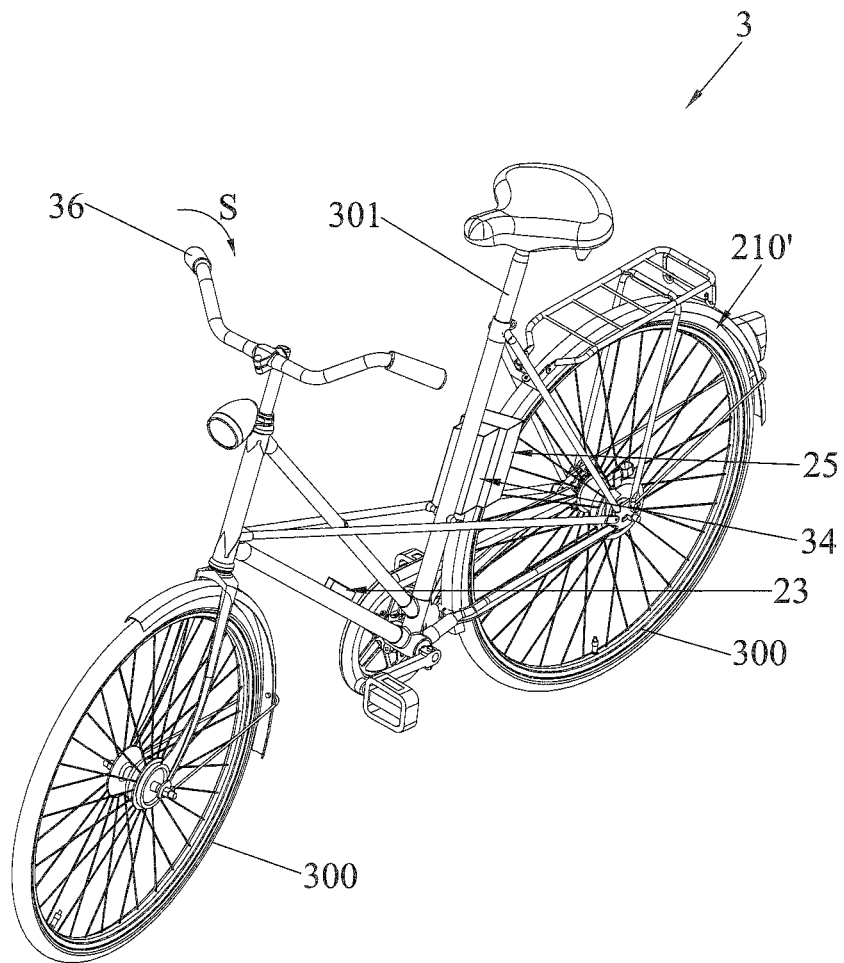
FIG. 10A is a three-dimensional view of another embodiment of the mobility vehicle according to the present invention.

Moreover, the present invention can be applied to assist any human-power propelled wheel-type mobility vehicle such as a bicycle, a trolley, a baby buggy and the like, so is not limited to a power-assisted wheelchair. FIG. 10A is another embodiment of the mobility vehicle 3 according to the present invention.

In the embodiment, the mobility vehicle 3 is an electric bicycle. The personal mobility vehicle 30 comprises a vehicle body 301 and two wheel bodies 300 disposed on the

|  | Conventional art | Conventional art | Mobility vehicle of the present invention |
|---|---|---|---|
| Sensing Element | torque sensor | Single-axis accelerometer | multi-axis accelerometer and multi-axis gyroscope |
| Comparison | expensive, significant modification in the mechanical mechanism is required, difficult to calibrate | when sensing the inclination angle, the acceleration of the mobility vehicle may contaminate the angle information, which results in the delay of acquisition of the inclination angle signal, and thereby causes the failure to assist in real time. | 1. inexpensive, no mechanical modification is required. 2. the inclination angle signal of the ramp can be acquired in real time, and the inclination angle and the acceleration of the wheelchair can be determined separately. | front and rear sides of the vehicle body 301 to constitute a conventional bicycle structure. Further, the power-assisting system comprises one wheel hub motor 210' on the rear wheel, a module 34, including a motor power amplifier, such as a driver, a signal processing unit with a controller, disposed on the vehicle body 301, a sensing unit 23 and a power supply unit 25, where the power supply unit 25 can be a lithium iron phosphate battery. In addition, the wires used in the power-assisting system according to the present invention can be disposed and wired depending on the practical needs, and thus are not depicted in the drawings.

Figures 10B, 10C:
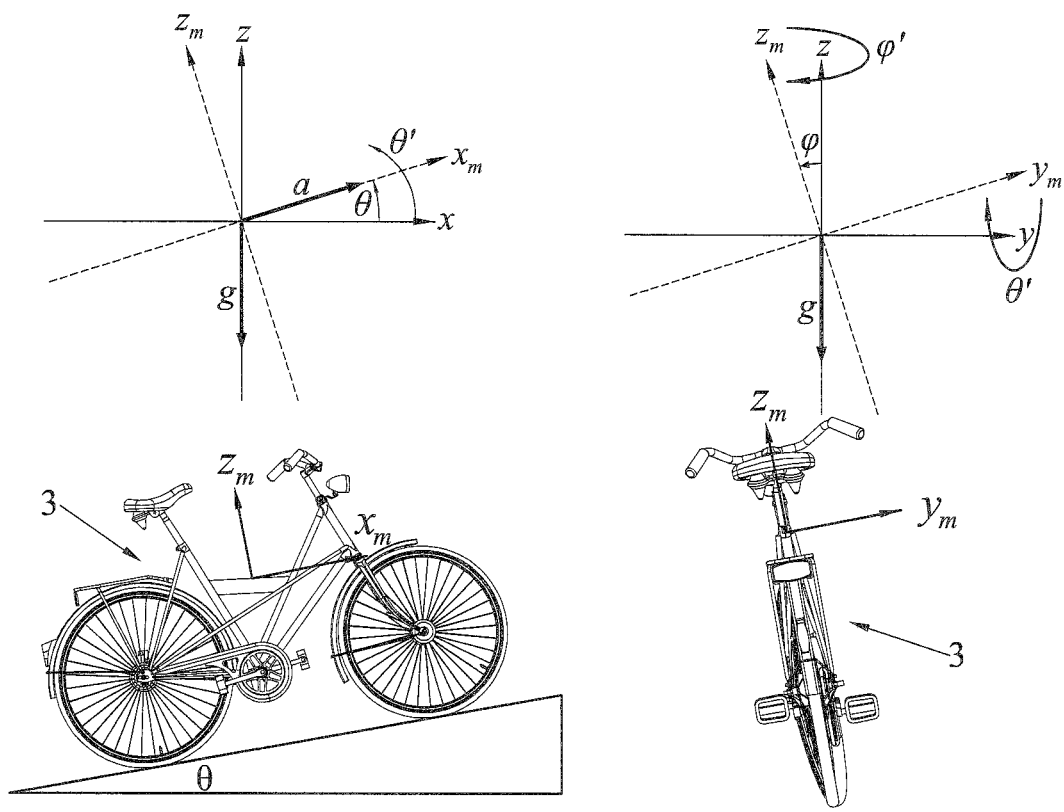
FIGS. 10B and 10C show the calculation carried out by the signal processing unit of the power-assisted bicycle according to the present invention using signals of a tri-axial accelerometer and a biaxial gyroscope.

When in use, because the bicycle tends to lean or roll laterally, as shown in FIGS. 10B and 10C, it is needed to employ a tri-axial accelerometer to measure accelerations $a_{Xm}$, $a_{Zm}$, and $a_{Ym}$, and to employ a biaxial gyroscope to measure an absolute pitching angular velocity $\omega_{Ym}$ and an absolute rolling angular velocity $\omega_{Zm}$. Furthermore, the tri-axial accelerometer measures the accelerations to the movement direction $X_m$, the vertical direction $Z_m$, and the lateral direction $Y_m$ of the bicycle. When the bicycle moves on a ramp having a lean or roll angle $\phi$ with an inclination angle $\theta$ and an acceleration $a$, and makes a turn with an angular velocity $d\psi/dt$, according to FIG. 10B, the signals of the tri-axial accelerometer are:

$$a_{Xm} = g \sin\theta + a;$$

$$a_{Ym} = g \sin\phi;$$

$$a_{Zm} = g \cos\theta;$$

and the absolute angular velocities measured by the biaxial gyroscope are:

$$\omega_{Ym} = d\theta/dt \cdot \cos\phi + d\psi/dt \cdot \sin\phi;$$

$$\omega_{Zm} = -d\theta/dt \cdot \sin\phi + d\psi/dt \cdot \cos\phi;$$

Figure 11:
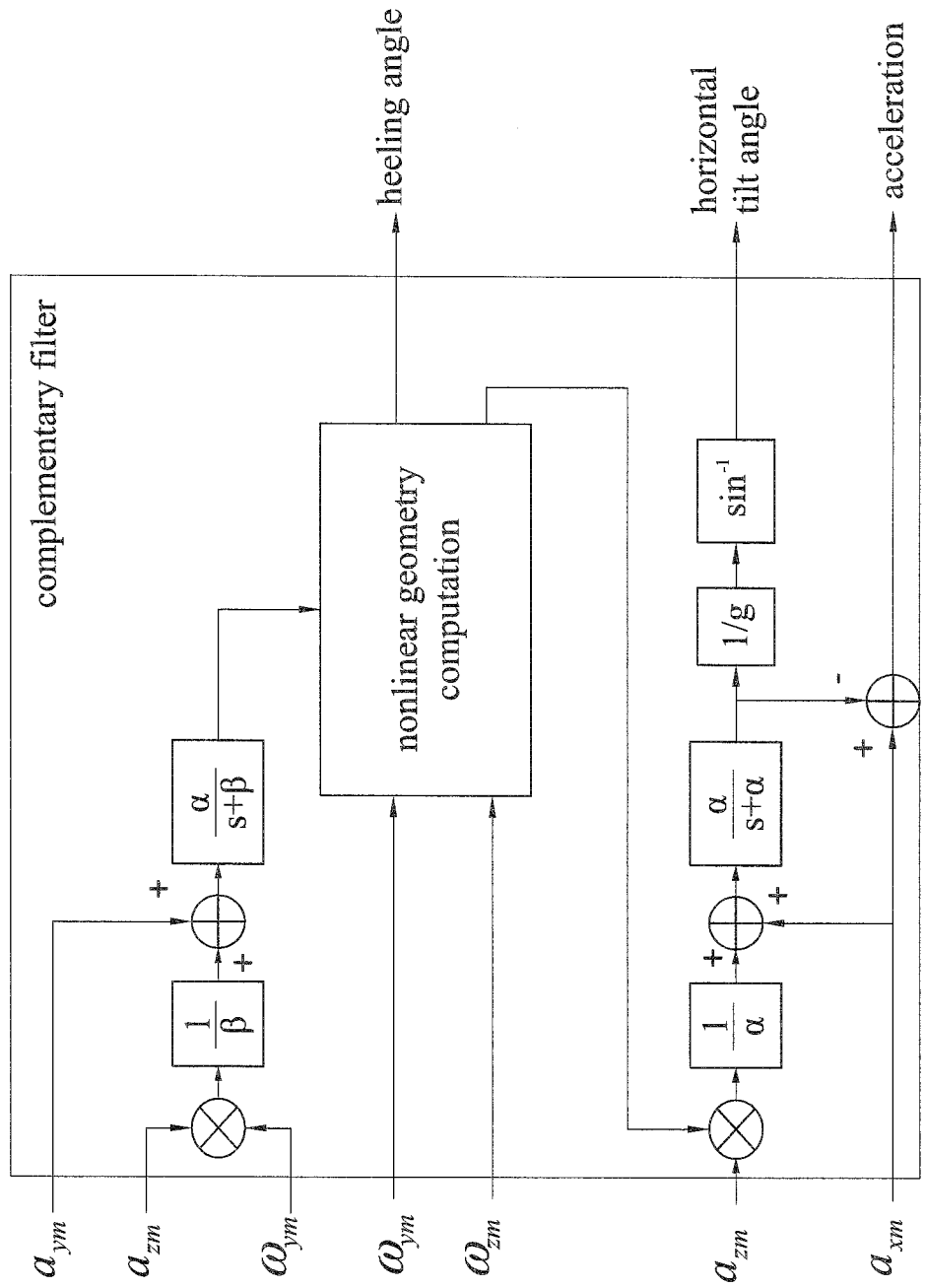
FIG. 11 shows another signal processing method of the signal processing unit according to the present invention.

Afterward, the precise and high-bandwidth signals of the acceleration, inclination angle and lean or roll angle of the mobility vehicle 3 can be obtained from $a_{Xm}$, $a_{Zm}$, $a_{Ym}$, $\omega_{Ym}$ and $\omega_{Zm}$ by the signal processing method shown in FIG. 11. Basically, the signal processing method shown in FIG. 11 is an extension of FIG. 8. The signal processing method shown in FIG. 11 expands the complementary filter to 3-dimension, and further obtains the acceleration, inclination angle and lean or roll angle of the mobility vehicle through the nonlinear geometry computation, thereby reducing the time delay and the error caused by geometric nonlinearity.

Therefore, if the mobility vehicle (such as a wheelchair and a baby buggy) does not lean easily while making a turn, the signal processing method as shown in FIG. 8 can be employed; otherwise if the mobility vehicle (such as a bicycle) tends to lean easily while making a turn, the signal processing method as shown in FIG. 11 should be employed.

In addition, the present invention further comprises a regulator 36 (as shown in FIG. 10A) transmitting electrical signals through a method of wired transmission or wireless transmission to the signal processing unit 24 to adjust the damping compensation, inertia compensation, and gravity compensation, for example, by turning a knob or a grip to generate an electrical signal and transmit the electrical signal to the signal processing unit 24. Accordingly, the user can transmit an electrical signal to the signal processing unit through the method of wired transmission or wireless transmission to adjust the magnitude of the resulting damping compensation, inertia compensation, and gravity compensation.

The present invention has been described using exemplary embodiments to illustrate the principles and the effects of the present invention, but not intend to limit the present invention. The present invention without departing from the spirit and scope of the premise can make various changes and modifications by a person skilled in the art. Therefore, the scope of protection of the rights of the invention should be defined by the appended claims.

The invention claimed is:

1. A power-assisting system providing at least an assisting power to a personal mobility vehicle that itself is human-powered, the power-assisting system comprising:
    at least one actuation unit comprising a motor and a power amplifier geared with the motor;
    a sensing unit comprising a rotating speed sensor, a multi-axis accelerometer and a multi-axis gyroscope and configured for sensing acceleration of the personal mobility vehicle, an angular velocity of the personal mobility vehicle and a rotating speed of the motor; and
    a signal processing device unit connected to the actuation unit and the sensing unit to process signals of the sensing unit, so as for the actuation unit to generate damping compensation, inertia compensation, and gravity compensation in accordance with the processed signals.

2. The power-assisting system of claim 1, wherein the signal processing unit is connected to the power amplifier.

3. The power-assisting system of claim 1, wherein the signal processing unit is digital, so as to convert the signals of the sensing unit into digital signals.

4. The power-assisting system of claim 1, wherein the signal processing unit uses the multi-axis accelerometer and the multi-axis gyroscope to calculate an inclination signal and an acceleration signal by a method of nonlinear complementary filtering.

5. The power-assisting system of claim 1 further comprising a regulator used for transmitting an electrical signal to the signal processing unit by a method of wired transmission or wireless transmission, so as to adjust the damping compensation, the inertia compensation and the gravity compensation.

6. The power-assisting system of claim 1, further comprising at least one power supply unit electrically connected to the actuation unit, the signal processing unit and the sensing unit, wherein the power supply unit serves as a power supply of the actuation unit, the signal processing unit and the sensing unit.

7. A mobility vehicle, comprising:
    a personal mobility vehicle, comprising at least one wheel body, wherein the personal mobility vehicle itself is human-powered; and
    the power-assisting system of claim 1, in which the actuation unit is connected to the wheel body, and the rotating speed, the angular velocity and the acceleration, which includes a gravitational acceleration, of the vehicle sensed by the sensing unit correspond to a velocity, an absolute angular velocity and an acceleration of the personal mobility vehicle in motion, and are processed by the signal processing unit to produce a vehicle velocity, an inclination angle and a motion acceleration of the personal mobility vehicle.

8. The mobility vehicle of claim 7, wherein the acceleration sensed by the sensing unit is a combination of the motion acceleration of the mobility vehicle in motion and the gravitational acceleration, and the signal processing unit processes the signal of the sensing unit to calculate the motion acceleration, which does not include gravitational acceleration, of the personal mobility vehicle in motion.

9. The mobility vehicle of claim 7, wherein the signal processing unit is connected to the power amplifier to provide damping compensation, inertia compensation and gravity compensation to the personal mobility vehicle.

10. The mobility vehicle of claim 7, wherein the motor is disposed on the wheel body, such that the motor and the wheel body constitute a wheel hub motor.

11. The mobility vehicle of claim 7, wherein the signal processing unit is digital.

12. The mobility vehicle of claim 7, wherein the signal processing unit uses the multi-axis accelerometer and the multi-axis gyroscope to calculate a signal of inclination angle and a signal of acceleration by a method of nonlinear complementary filtering when the mobility vehicle tends to lean laterally.

13. The mobility vehicle of claim 7 further comprising a regulator used for transmitting an electrical signal to the signal processing unit with a method of wired transmission or wireless transmission, so as to adjust the damping compensation, the inertia compensation and the gravitational compensation.

14. The mobility vehicle of claim 7, further comprising at least one power supply unit electrically connected to the actuation unit, the signal processing unit and the sensing unit, wherein the power supply unit serves as a power supply of the power unit, the signal processing unit and the sensing unit.

* * * * *